(12) United States Patent
Yang et al.

(10) Patent No.: US 12,118,339 B2
(45) Date of Patent: Oct. 15, 2024

(54) IMAGE FILE OBTAINING METHOD AND APPARATUS

(71) Applicant: HUAWEI TECHNOLOGIES CO., LTD., Shenzhen (CN)

(72) Inventors: Tao Yang, Shenzhen (CN); Chuancai Gu, Shanghai (CN); Qiulin Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 17/727,166

(22) Filed: Apr. 22, 2022

(65) Prior Publication Data

US 2022/0244931 A1 Aug. 4, 2022

Related U.S. Application Data

(63) Continuation of application No. PCT/CN2020/113239, filed on Sep. 3, 2020.

(30) Foreign Application Priority Data

Oct. 24, 2019 (CN) .......................... 201911018528.0

(51) Int. Cl.
*G06F 8/54* (2018.01)
(52) U.S. Cl.
CPC ...................... *G06F 8/54* (2013.01)
(58) Field of Classification Search
CPC ... G06F 8/447; G06F 8/52; G06F 8/54; G06F 8/63; G06F 8/70; G06F 8/76; G06F 9/445; G06F 9/455; G06F 9/4818; G06F 9/4881
See application file for complete search history.

(56) References Cited

U.S. PATENT DOCUMENTS 8,719,808 B1 * 5/2014 Prinzing ............. G06F 9/44542
717/162
9,367,305 B1 6/2016 Kumar et al.
(Continued)

FOREIGN PATENT DOCUMENTS

CN 101515239 A 8/2009
CN 101794232 A 8/2010
(Continued)

OTHER PUBLICATIONS

Liu et al., English translation of WO2017/148171A, pp. 1-20, published on Sep. 8, 2017 (Year: 2017).*
(Continued)

*Primary Examiner* — S. Sough
*Assistant Examiner* — Zheng Wei
(74) *Attorney, Agent, or Firm* — HAUPTMAN HAM, LLP

(57) ABSTRACT

An image file obtaining method includes: determining a first value of each of N tasks in program source code, where the first value is first duration required for executing each of the N tasks or the first value is a ratio of the first duration to second duration, the second duration is duration required for loading each of the N tasks, and N is a positive integer; sorting the N tasks in descending order of the first values; and linking the sorted N tasks to obtain an image file. After downloading the image file, an embedded apparatus successively loads and executes the sorted N tasks, thereby shortening a startup time period of the embedded apparatus.

17 Claims, 9 Drawing Sheets

(56) References Cited

U.S. PATENT DOCUMENTS

| | | | |
|---|---|---|---|
| 2001/0042069 A1* | 11/2001 | Petrov | G06F 8/54 |
| | | | 707/999.102 |
| 2003/0121024 A1 | 6/2003 | Hill et al. | |
| 2003/0140174 A1* | 7/2003 | Ohishi | G06F 8/71 |
| | | | 718/107 |
| 2007/0050762 A1* | 3/2007 | Chen | G06F 8/71 |
| | | | 717/169 |
| 2010/0262839 A1 | 10/2010 | Eker et al. | |
| 2011/0246998 A1* | 10/2011 | Vaidya | G06F 9/4881 |
| | | | 718/103 |
| 2014/0165038 A1* | 6/2014 | Kaler | G06F 8/73 |
| | | | 717/123 |
| 2014/0280719 A1 | 9/2014 | Cepuran | |
| 2016/0203020 A1* | 7/2016 | Chen | G06F 11/00 |
| | | | 718/102 |
| 2016/0357516 A1* | 12/2016 | Kogel | G06F 11/3612 |
| 2018/0365035 A1 | 12/2018 | Liu et al. | |
| 2020/0159536 A1* | 5/2020 | Saidi | G06F 9/455 |
| 2020/0225917 A1* | 7/2020 | Jung | G06F 9/45558 |

FOREIGN PATENT DOCUMENTS

| | | |
|---|---|---|
| CN | 105630543 A | 6/2016 |
| CN | 105760201 A | 7/2016 |
| CN | 106055462 A | 10/2016 |
| CN | 103677922 B | 1/2018 |
| CN | 109284137 A | 1/2019 |
| CN | 114064141 A | 2/2022 |

OTHER PUBLICATIONS

International Search Report issued in corresponding International Application No. PCT/CN2020/113239, dated Dec. 4, 2020, pp. 1-11.

Extended European Search Report issued in corresponding European Application No. 20879292.9, dated Oct. 21, 2022, pp. 1-12.

Chinese First Office Action issued in corresponding Chinese Application No. 201911018528.0, dated Jul. 3, 2023, pp. 1-8.

* cited by examiner ial Application
IMAGE FILE OBTAINING METHOD AND APPARATUS

CROSS-REFERENCE TO RELATED APPLICATIONS

This application is a continuation of International Application No. PCT/CN2020/113239, filed on Sep. 3, 2020, which claims priority to Chinese Patent Application No. 201911018528.0, filed on Oct. 24, 2019. The disclosures of the aforementioned applications are hereby incorporated by reference in their entireties.

TECHNICAL FIELD

This application relates to the field of communication technologies, and specifically, to an image file obtaining method.

BACKGROUND

An embedded device includes a host and a target machine. The host and the target machine are developed based on different architectures. The host is responsible for development and compilation, or in other words, the host is a development and compilation apparatus. The target machine runs a compiled program downloaded from the host. The target machine is also referred to as an embedded apparatus.

For the embedded apparatus, a system startup speed of the embedded apparatus is an important measurement indicator. In particular, for a consumption embedded apparatus, for example, an event data recorder, a camera, or a smart printing server, a system startup time period directly affects user experience.

Generally, a monolithic kernel is used as a preferred kernel architecture of the embedded apparatus. Therefore, kernel program code and application program code of the embedded apparatus are packaged together for development and debugging. The two parts of code are compiled and linked to generate one complete image file, and then the image file is deployed in the embedded apparatus. Because the image file is loaded after the embedded apparatus is powered on, a loading speed of the image file is closely related to a startup speed of the embedded apparatus. Therefore, how to implement fast loading of the image file and shorten a startup time period of the embedded apparatus is an urgent problem to be resolved.

SUMMARY

Embodiments of this application provide an image file obtaining method, to shorten a startup time period of an embedded apparatus.

To achieve the foregoing objective, the embodiments of this application provide the following technical solutions.

A first aspect of this application provides an image file obtaining method. The method may include: determining a first value of each of N tasks in program source code, where a task is a code set for implementing some functions, each task may include several functions, the first value is first duration required for executing each of the N tasks or the first value is a ratio of the first duration to second duration, the second duration is duration required for loading each of the N tasks, and N is a positive integer; sorting the N tasks in descending order of the first values; and linking the sorted N tasks to obtain an image file. It can be learned from the first aspect that, the N tasks are sorted in descending order of execution time periods or sorted in descending order of time ratio values. In this case, after the sorted N tasks are linked to generate the image file, an embedded apparatus can first load a task whose execution time period is relatively long after downloading the image file, so that a next task can be loaded in an execution process of a current task; or an embedded apparatus can first load a task whose loading time period is short but task execution time period is long after downloading the image file, so that it can be ensured that total duration required for completing the N tasks is the shortest, and a startup time period of the embedded apparatus is shortened.

Optionally, with reference to the first aspect, in a first possible implementation, the method further includes: obtaining a functional dependency relationship of each of the N tasks, where the functional dependency relationship of each task is a call relationship between functions included in each of the N tasks; and the linking the sorted N tasks to obtain an image file includes: linking, based on the functional dependency relationship of each of the N tasks, the functions included in each of the sorted N tasks, to obtain the image file.

Optionally, with reference to the first possible implementation of the first aspect, in a second possible implementation, the obtaining a functional dependency relationship of each of the N tasks may include: obtaining syntax tree information of all tasks in the program source code, where all the tasks may include the N tasks; obtaining functional dependency relationships of all the tasks based on the syntax tree information, where the functional dependency relationships of all the tasks are call relationships between functions that may be included in all the tasks; and determining the functional dependency relationship of each of the N tasks based on an annotation in the program source code and the functional dependency relationships of all the tasks, where the annotation is preset and is used to identify a function of a task, and functions of the N tasks are prespecified. It can be learned from the second possible implementation of the first aspect that the functional dependency relationship of each task may be obtained based on the syntax tree information and the annotation in the program source code, thereby enhancing diversity of the solution.

Optionally, with reference to the first aspect or the first or the second possible implementation of the first aspect, in a third possible implementation, the method may further include: performing division on the program source code, where the program source code obtained after division may include program source code corresponding to the N tasks and program source code corresponding to M tasks, the N tasks correspond to a key service of the embedded apparatus, and the M tasks correspond to a service of the embedded apparatus other than the key service. It can be learned from the second possible implementation of the first aspect that the N tasks are key tasks. In an embedded startup scenario, a key task is first loaded and executed, thereby shortening the startup time period of the embedded apparatus.

Optionally, with reference to the first aspect or the first to the third possible implementations of the first aspect, in a fourth possible implementation, the determining a first value of each of N tasks in program source code may include: determining a start location and an end location of each of the N tasks based on the functional dependency relationship of each of the N tasks, where the start location includes a first timestamp, and the end location includes a second timestamp; and running each of the N tasks, and determining the first value based on a difference between the first timestamp and the second timestamp.

A second aspect of this application provides a method for starting an embedded apparatus. The method may include: loading N tasks in a system image file, and running the N tasks, where the N tasks are linked in descending order of first values, the first value is first duration required for executing each of the N tasks or the first value is a ratio of the first duration to second duration, the second duration is duration required for loading each task, and N is a positive integer. It can be learned from the second aspect that, according to the solution provided in this application, in a process of starting an embedded apparatus, not only a key task can be first loaded and executed, but also a time period required for loading the key task can further be shortened. In this solution, the key tasks are sorted, and the N tasks are linked based on the order to generate the image file. In this way, a next task can be loaded during running of a current key task, to concurrently implement loading operations and execution operations on different tasks to a greatest extent, thereby ensuring fast start of the embedded apparatus.

Optionally, with reference to the second aspect, in a first possible implementation, the method may further include: loading one or more tasks included in the image file other than the N tasks in the image file after the N tasks are run.

A third aspect of this application provides an image file obtaining apparatus. The apparatus may include a memory, configured to store computer-readable instructions; and may further include a processor coupled to the memory, where the processor is configured to execute the computer-readable instructions in the memory to perform the following operations: determining a first value of each of N tasks in program source code, where the first value is first duration required for executing each of the N tasks or the first value is a ratio of the first duration to second duration, the second duration is duration required for loading each of the N tasks, and N is a positive integer; sorting the N tasks in descending order of the first values; and linking the sorted N tasks to obtain an image file.

Optionally, with reference to the third aspect, in a first possible implementation, the processor is further configured to: obtain a functional dependency relationship of each of the N tasks, where the functional dependency relationship of each task is a call relationship between functions that may be included in each of the N tasks; and link, based on the functional dependency relationship of each of the N tasks, the functions that may be included in each of the sorted N tasks, to obtain the image file.

Optionally, with reference to the first possible implementation of the third aspect, in a second possible implementation, the processor is specifically configured to: obtain syntax tree information of all tasks in the program source code, where all the tasks may include the N tasks; obtain functional dependency relationships of all the tasks based on the syntax tree information, where the functional dependency relationships of all the tasks are call relationships between functions that may be included in all the tasks; and determine the functional dependency relationship of each of the N tasks based on an annotation in the program source code and the functional dependency relationships of all the tasks, where the annotation is preset and is used to identify a function of a task, and functions of the N tasks are prespecified.

Optionally, with reference to the third aspect or the first or the second possible implementation of the third aspect, in a third possible implementation, the processor is further configured to perform division on the program source code, where the program source code obtained after division may include program source code corresponding to the N tasks and program source code corresponding to M tasks, the N tasks correspond to a key service of an embedded apparatus, and the M tasks correspond to a service of the embedded apparatus other than the key service.

Optionally, with reference to the third aspect or the first to the third possible implementations of the third aspect, in a fourth possible implementation, the processor is specifically configured to: determine a start location and an end location of each of the N tasks based on the functional dependency relationship of each of the N tasks, where the start location may include a first timestamp, and the end location may include a second timestamp; and run each of the N tasks, and determine the first value based on a difference between the first timestamp and the second timestamp.

A fourth aspect of this application provides an embedded apparatus. The embedded apparatus may include a memory, configured to store computer-readable instructions; and may further include a processor coupled to the memory, where the processor is configured to execute the computer-readable instructions in the memory to perform the following operation: loading N tasks in a system image file, and running the N tasks, where the N tasks are linked in descending order of first values, the first value is first duration required for executing each of the N tasks or the first value is a ratio of the first duration to second duration, the second duration is duration required for loading each task, and N is a positive integer.

Optionally, with reference to the fourth aspect, in a first possible implementation, the processor is further configured to: load one or more tasks that may be included in the image file other than the N tasks in the image file after the N tasks are run.

A fifth aspect of this application provides an image file obtaining apparatus. The apparatus may include a storage unit, configured to store computer-readable instructions; and may further include a processing unit, configured to execute the computer-readable instructions in the storage unit to perform the following operations: determining a first value of each of N tasks in program source code, where the first value is first duration required for executing each of the N tasks or the first value is a ratio of the first duration to second duration, the second duration is duration required for loading each of the N tasks, and N is a positive integer; sorting the N tasks in descending order of the first values; and linking the sorted N tasks to obtain an image file.

Optionally, with reference to the fifth aspect, in a first possible implementation, the processing unit is further configured to: obtain a functional dependency relationship of each of the N tasks, where the functional dependency relationship of each task is a call relationship between functions that may be included in each of the N tasks; and link, based on the functional dependency relationship of each of the N tasks, the functions that may be included in each of the sorted N tasks, to obtain the image file.

Optionally, with reference to the first possible implementation of the fifth aspect, in a second possible implementation, the processing unit is specifically configured to: obtain syntax tree information of all tasks in the program source code, where all the tasks may include the N tasks; obtain functional dependency relationships of all the tasks based on the syntax tree information, where the functional dependency relationships of all the tasks are call relationships between functions that may be included in all the tasks; and determine the functional dependency relationship of each of the N tasks based on an annotation in the program source code and the functional dependency relationships of all the tasks, where the annotation is preset and is used to identify a function of a task, and functions of the N tasks are prespecified.

Optionally, with reference to the fifth aspect or the first or the second possible implementation of the fifth aspect, in a third possible implementation, the processing unit is further configured to perform division on the program source code, where the program source code obtained after division may include program source code corresponding to the N tasks and program source code corresponding to M tasks, the N tasks correspond to a key service of an embedded apparatus, and the M tasks correspond to a service of the embedded apparatus other than the key service.

Optionally, with reference to the fifth aspect or the first to the third possible implementations of the fifth aspect, in a fourth possible implementation, the processing unit is specifically configured to: determine a start location and an end location of each of the N tasks based on the functional dependency relationship of each of the N tasks, where the start location may include a first timestamp, and the end location may include a second timestamp; and run each of the N tasks, and determine the first value based on a difference between the first timestamp and the second timestamp.

A sixth aspect of this application provides an embedded apparatus. The embedded apparatus may include a storage unit (or referred to as a memory), configured to store computer-readable instructions; and may further include a processing unit (or referred to as a processor), configured to execute the computer-readable instructions in the storage unit to perform the following operation: loading N tasks in a system image file, and running the N tasks, where the N tasks are linked in descending order of first values, the first value is first duration required for executing each of the N tasks or the first value is a ratio of the first duration to second duration, the second duration is duration required for loading each task, and N is a positive integer.

Optionally, with reference to the sixth aspect, in a first possible implementation, the processing unit is further configured to: load one or more tasks that may be included in the image file other than the N tasks in the image file after the N tasks are run.

A seventh aspect of this application provides a computer-readable storage medium. The computer-readable storage medium stores instructions; and when the instructions are run on a computer, the computer is enabled to perform the image file obtaining method according to any one of the first aspect or the possible implementations of the first aspect.

An eighth aspect of this application provides a computer-readable storage medium. The computer-readable storage medium stores instructions. When the instructions are run on a computer, the computer is enabled to perform the method for starting an embedded apparatus according to any one of the second aspect or the possible implementations of the second aspect. The computer may include one or more processing units.

A ninth aspect of this application provides a computer program product including instructions. When the instructions are run on a computer, the computer is enabled to perform the image file obtaining method according to any one of the first aspect or the possible implementations of the first aspect.

A tenth aspect of this application provides a computer program product including instructions. When the instructions are run on a computer, the computer is enabled to perform the method for starting an embedded apparatus according to any one of the second aspect or the possible implementations of the second aspect.

For technical effects brought by any implementation in the third aspect, fifth aspect, seventh aspect, and ninth aspect, refer to technical effects brought by different implementations according to the first aspect. Details are not described herein again.

For technical effects brought by any implementation in the fourth aspect, sixth aspect, eighth aspect, and tenth aspect, refer to technical effects brought by different implementations according to the second aspect. Details are not described herein again.

According to the image file obtaining method provided in this application, the N tasks are sorted in descending order of required execution time periods or sorted in descending order of time ratio values. In this case, after the N tasks are linked to obtain the image file, the embedded apparatus can first load a task whose execution time period is relatively long after downloading the image file, so that a next task can be loaded in an execution process of a current task; or the embedded apparatus can first load a task whose loading time period is short but task execution time period is long after downloading the image file, so that it can be ensured that total duration required for completing the N tasks is the shortest, and a startup time period of the embedded apparatus is shortened.

DESCRIPTION OF EMBODIMENTS

Figure 1:
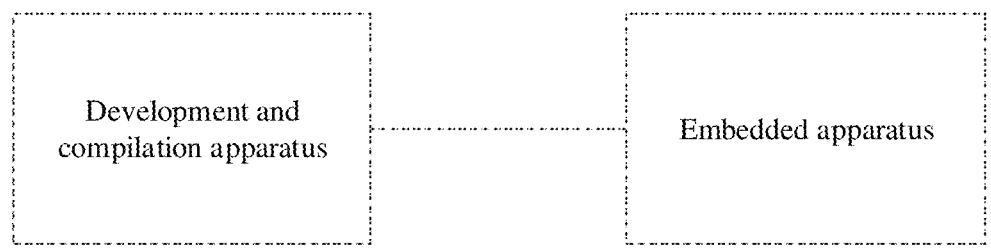
FIG. 1 is a schematic diagram of an embedded device according to an embodiment of this application.

The following describes embodiments of this application with reference to accompanying drawings. It is clear that the described embodiments are merely some but not all of the embodiments of this application. A person of ordinary skill in the art may learn that, with technology development and emergence of a new scenario, the technical solutions provided in the embodiments of this application are also applicable to a similar technical problem.

The embodiments of this application provide an image file obtaining method, a method for starting an embedded apparatus, and an embedded apparatus. According to the technical solutions provided in this application, locations of different tasks in an image file are adjusted in descending order of task execution time periods or in descending order of task time ratio values, and one or more next tasks can be loaded in an execution process of a current task, to implement fast start of an embedded apparatus. The following separately provides detailed descriptions.

In the specification, claims, and the accompanying drawings of this application, the terms "first", "second", and the like are intended to distinguish between similar objects but do not necessarily indicate a specific order or sequence. It should be understood that data used in such a way are interchangeable in proper circumstances, so that the embodiments described herein can be implemented in an order other than orders illustrated or described herein. In addition, terms "include" and "have" and any variations thereof are intended to cover non-exclusive inclusions, for example, a process, method, system, product, or device including a series of steps or modules need not be limited to those clearly listed steps or modules, but may include other steps or modules that are not clearly listed or are inherent to these processes, methods, products, or devices. Naming or numbering of steps in this application does not mean that steps in the method procedure need to be performed according to a time/logical order indicated by the naming or numbering. An execution order of process steps that have been named or numbered may be changed based on a technical objective to be implemented, provided that a same or similar technical effect can be achieved. Division into the modules in this application is logical division. In actual application, there may be another division manner. For example, a plurality of modules may be combined or integrated into another system, or some features may be ignored or not performed. In addition, the displayed or discussed mutual coupling or direct coupling or communication connection may be through some ports, and the indirect coupling or communication connection between modules may be in an electrical form or another similar form. This is not limited in this application. In addition, modules or submodules described as separate components may or may not be physically separated, may or may not be physical modules, or may be distributed to a plurality of circuit modules. Some or all of the modules may be selected based on an actual requirement to implement the objectives of the solutions of this application.

FIG. 1 is a schematic diagram of an embedded device according to an embodiment of this application. As shown in FIG. 1, the embedded device includes a development and compilation apparatus and an embedded apparatus. The development and compilation apparatus is a host, and the embedded apparatus is a target machine. This application is used to implement fast start of the embedded apparatus. The target machine, namely, the embedded apparatus, may be an event data recorder, an intelligent print server, a camera, a smart camera, or the like. Correspondingly, the host is responsible for developing and compiling a system program of the target machine such as an event data recorder, an intelligent print server, a camera, or a smart camera.

Figure 2:
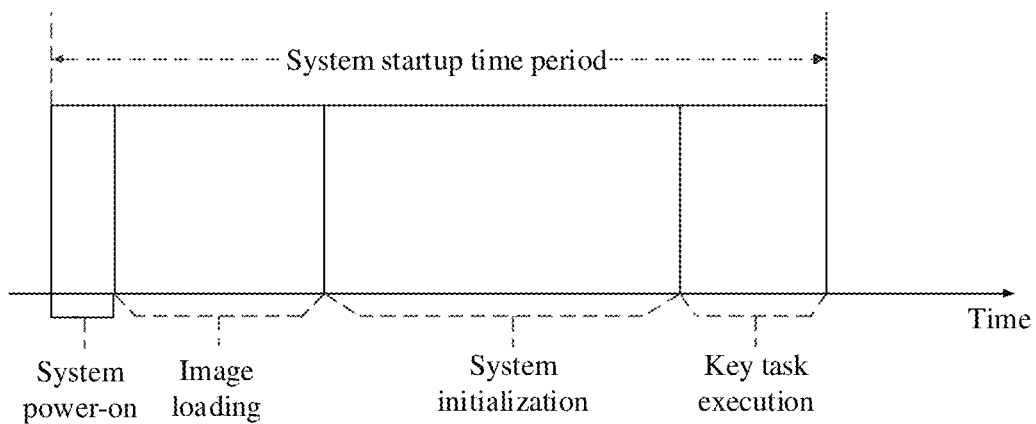
FIG. 2 is a schematic diagram of a startup time period of an embedded apparatus.

Generally, the embedded apparatus uses a monolithic kernel as its preferred kernel architecture. The monolithic kernel is a kernel architecture of an operating system. A characteristic of this architecture is that an entire kernel program is a single binary executable file and code can be run only in a kernel mode, namely, a supervisor mode. A microkernel architecture corresponds to the monolithic kernel. The microkernel separates a kernel from a system service, so that the kernel has a modular attribute. Different modules communicate with each other through inter-process communication (inter-process communication, IPC). Performance of the microkernel is far lower than that of the monolithic kernel. Because an embedded system uses a monolithic kernel as a kernel architecture, kernel program code and application program code of the embedded system are packaged together for development and debugging. The two parts of code are compiled and linked to form a complete binary image file, and then the binary file is deployed in the embedded apparatus. During measurement of an index of a startup time period of such embedded apparatus, an interval from a moment at which the embedded apparatus is powered on to a moment at which a specified key task is executed is usually used as a startup time period of the device. For different embedded apparatuses, specified key tasks are usually different. For example, a key service of an event data recorder may be a camera service and a wireless connection service. In this case, duration between a moment at which the event data recorder is powered on and a moment at which the camera service and the wireless connection service are executed is a startup time period of the event data recorder. For another example, for a smart camera, a key task may be an image display task. In this case, a startup time period of the smart camera is duration between a moment at which the smart camera is powered on and a moment at which the image display task is executed. The task mentioned in this application refers to a set of code blocks for implementing a specific function, and includes at least one complete function code block. FIG. 2 is a schematic diagram of a startup time period of an embedded apparatus. The startup time period of the embedded apparatus may include duration required for powering on a system, duration required for image loading, duration required for initializing the system, and duration required for executing a key task. Loading in this application refers to transmitting program code from another storage medium to a memory. When a loading program is used to load the program code into the memory, an address, an offset, or other information of the program code is first updated to a process control block. When a processor accesses the address, a page fault is triggered. In this case, the program code is really copied to the memory.

To shorten a startup time period of an embedded apparatus, there are two manners. One manner is a fast start solution based on a snapshot method, and the other manner is a fast start solution based on a scatter loading method. The two solutions are described below.

Figure 3:
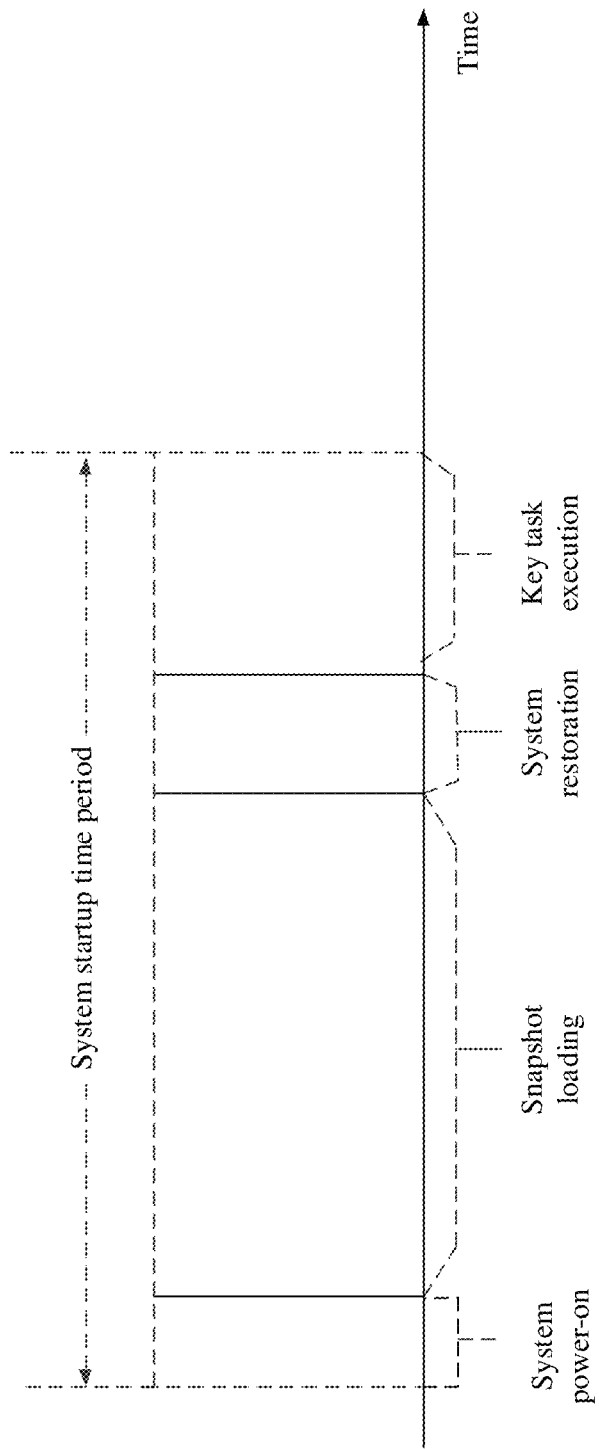
FIG. 3 is a schematic diagram of a startup time period in a fast start technology based on a snapshot method.

Snapshot is a data copy technology that is used based on a time point or that is used when a program is executed to a location point. A size of copied data is not limited. The copied data may be data of a single task or data in an entire memory. In the fast start solution based on the snapshot method, kernel program code and application program code of an embedded system are packaged, compiled, and linked to form a complete binary executable image file, and then the image file is burned to the embedded apparatus. When the embedded apparatus is started for the first time, after a specified task (the specified task may be considered as a key task) is executed, an operation of taking a snapshot of the entire system starts to be performed, and the snapshot is stored at a specified location in a storage medium. FIG. 3 is a schematic diagram of a startup time period in a fast start technology based on a snapshot method. As shown in FIG. 3, when an embedded apparatus is powered on and started again, a system snapshot (instead of an original image) is first loaded into a memory, and then a snapshot restoration operation starts to be performed to mainly restore system status information, memory information, and the like. After the snapshot restoration operation is successfully performed, the embedded apparatus may continue to execute program code at a location at which the snapshot is stored, to fast start the embedded apparatus.

According to the fast start solution based on the snapshot method, additional storage space is required for a snapshot image, increasing costs of the embedded apparatus. Therefore, the snapshot method is more inapplicable to an embedded apparatus with limited storage space.

Figure 4:
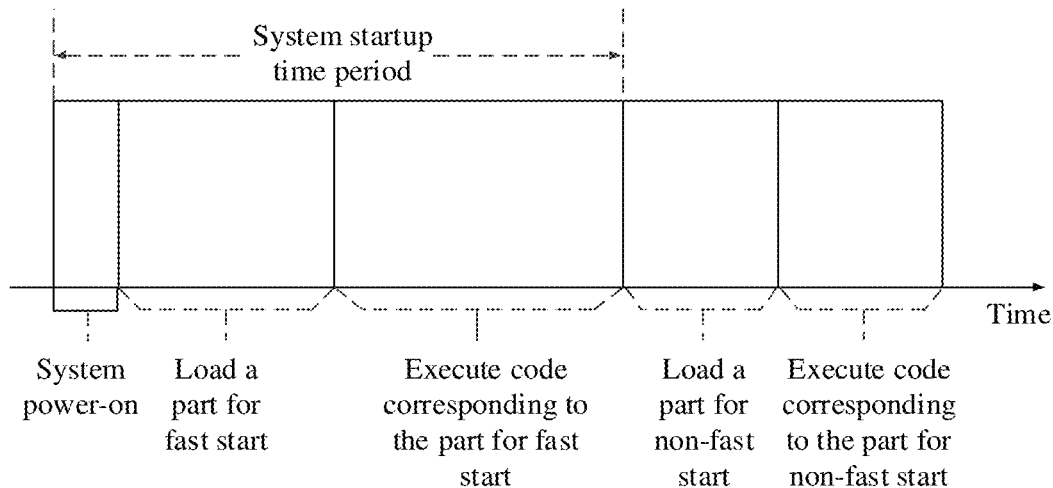
FIG. 4 is a schematic diagram of a startup time period in a fast start solution based on a scatter loading method.

Scatter loading refers to dividing an application program into two relatively independent parts, first loading a first part of code, and then loading a second part of code. In the fast start solution based on the scatter loading method, entire system program code is divided into two parts, and the entire system program code includes all kernel program code and all application program code. To be specific, the first part is code used in an interval from a moment at which the embedded apparatus is powered on and started to a moment at which a key task is executed, and the second part is code used for other tasks subsequently. Dividing the first part of code into relatively independent parts is a core step of the scatter loading method. In the scatter loading method, a developer needs to obtain program code related to the first part through tailoring and screening, modify a link script file to place the first part of code in a specified segment of an image, and finally divide the entire image into two relatively independent parts: a part for fast start and a part for non-fast start. FIG. 4 is a schematic diagram of a startup time period in a fast start solution based on a scatter loading method. As shown in FIG. 4, after an embedded apparatus is powered on and started, a part for fast start, namely, the first part described above, in an image file is first loaded; after the part for fast start is loaded, code corresponding to the part for fast start is executed; after the code corresponding to the part for fast start is executed, a part for non-fast start in the image file is loaded; and after the part for non-fast start is loaded, code corresponding to the part for non-fast start is executed.

In the fast start technology based on the scatter loading method, a developer needs to separate, from entire system program code, the code corresponding to the part for fast start. The developer first creates a relatively independent project from startup of the embedded apparatus to execution of a key task, compares the project with a complete project, deletes code that is used in the original complete project and that is irrelevant to the code corresponding to the part for fast start, retains only necessary code or a necessary file, and then compiles and burns the tailored code and verify, through compilation and burning, whether the tailored code can ensure correct execution of the key task. In this process, the developer needs to invest a large amount of energy to locate and rectify an error that occurs, and an execution process is complex. Especially, for development of a complex embedded apparatus, the developer may not be able to complete the foregoing operations such as tailoring and debugging.

To resolve the foregoing problem, this application provides an image file obtaining method. Compared with the fast start solution based on the snapshot method, the solution provided in this application not only can fast start an embedded apparatus, but also can avoid occupation of additional storage space. Compared with the fast start solution based on the scatter loading method, in the solution provided in this application, a developer does not need to separate, from entire system program code, code corresponding to a part for fast start, and the developer does not need to invest a large amount of energy to locate and rectify an error that occurs, thereby simplifying a development process.

Figure 5:
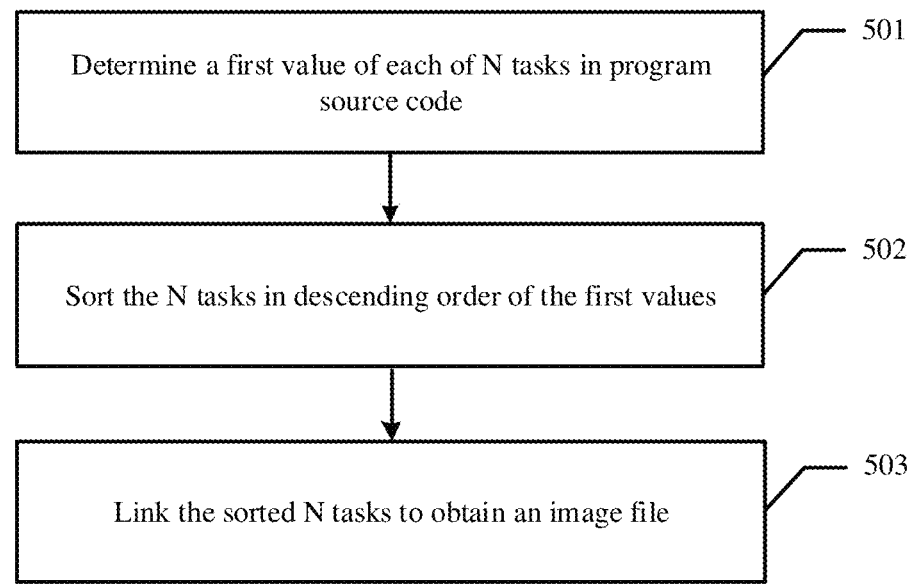
FIG. 5 is a schematic flowchart of an image file obtaining method according to an embodiment of this application.

FIG. 5 is a schematic flowchart of an image file obtaining method according to an embodiment of this application.

As shown in FIG. 5, the image file obtaining method may include the following steps.

501. Determine a first value of each of N tasks in program source code.

N is a positive integer. A task is a set of code for implementing some functions. Each task may include several functions. Program source code includes all kernel program source code and all application program source code. The program source code includes a plurality of tasks. Because the kernel program source code and the application program source code of an embedded apparatus based on a monolithic kernel architecture may be distributed at any locations in an image file, code included in each task, that is, a function included in each task, may be distributed at any location in the image file. The first value is first duration required for executing each of the N tasks or the first value is a ratio of the first duration to second duration, and the second duration is duration required for loading each task. In the following, duration required for executing one task is referred to as an execution time period for short, and duration required for loading one task is referred to as a loading time period for short.

For each of the N tasks, a loading time period and an execution time period of the task may be obtained. In this solution, a ratio of an execution time period to a loading time period may be referred to as a time ratio, and the first value may be an execution time period or may be a time ratio. A host may learn of an execution time period and a loading time period in a plurality of manners. For example, the following provides two manners of learning of an execution time period.

In a specific implementation, a functional dependency relationship of each of the N tasks in the program source code is obtained, and a start location and an end location of each task may be determined based on the functional dependency relationship of each task. The start location includes a first timestamp, and the end location includes a second timestamp. After each task is run, a difference between the first timestamp and the second timestamp may be determined. The task may be run for a plurality of times according to an actual requirement to obtain a plurality of differences between first timestamps and second timestamps, and an average value of the plurality of obtained differences between the first timestamps and the second timestamps may be considered as a time period required for executing one task. The functional dependency relationship of the task is a mutual call relationship between a plurality of functions included in the task. In this solution, the functional dependency relationship of each of the N tasks, that is, a dependency relationship between a plurality of functions included in each of the N tasks, may be analyzed by using a compiler analysis technology. In other words, the functional dependency relationship of each of the N tasks in the program source code is analyzed by using the compiler analysis technology, to determine a minimum code set required for each task. For example, it is assumed that N is 3, and the N tasks are respectively a first task, a second task, and a third task. The first task (task 1) includes function (func) 1-1, func1-2, func1-3, and func1-4. The second task (task 2) includes func2-1, func2-2, func2-3, and func2-4. The third task (task 3) includes func3-1, func3-2, func3-3, and func3-4. A plurality of functions included in the task 1, the task 2, and the task 3 may be distributed at any locations in the image file. By analyzing the program source code by using a compilation technology, the host may obtain functional dependency relationships of all of the task 1, the task 2, and the task 3. For example, by using the compiler analysis technology, the host obtains the following functional dependency relationship sets expressed in tasks:

{first task: func1-1, func1-2, func1-3, func1-4}
{second task: func2-1, func2-2, func2-3, func2-4}
{third task: func3-1, func3-2, func3-3, func3-4}

The compilation technology is a technology for translating, into binary machine language code that can be run on a computer, program code written in an advanced computer language. A method for obtaining a functional dependency relationship of a task by using the compilation technology and a method for obtaining a functional dependency relationship of a task by other means in a conventional technology can both be used in this application.

It should be noted that, in this application, "the host" is sometimes referred to as "a development and compilation apparatus for an embedded apparatus" or "an image file obtaining apparatus". When a difference among the three apparatuses is not specifically emphasized, a person skilled in the art should make it clear that the three apparatuses represent a same meaning.

A method for obtaining duration required for loading one task is similar to the foregoing method for obtaining duration required for executing one task. To be specific, the task may be loaded for a plurality of times to obtain a plurality of differences between first timestamps and second timestamps, and an average value of the plurality of obtained differences between the first timestamps and the second timestamps is considered as a time period required for loading one task.

In addition to the foregoing method for obtaining duration required for executing one task through a test, in a specific implementation, the execution time period and the loading time period may be obtained through calculation. For example, functions included in each task may be determined based on a dependency relationship that is of each of the N tasks and that is determined by the host, a sum of duration required for executing all the functions included in each task is the execution time period, and a sum of duration required for loading all the functions included in each task is the loading time period.

502. Sort the N tasks in descending order of the first values.

When the first value is an execution time period, the host may sort the N tasks in descending order of execution time periods. For example, N is 3, and the N tasks are respectively a task 1, a task 2, and a task 3. It is assumed that the host determines, based on execution time periods, that T1 is greater than T2 and T3 and that T2 is greater than T3. T1 represents an execution time period of the task 1, T2 represents an execution time period of the task 2, and T3 represents an execution time period of the task 3. Because T1>T2>T3, an order of the N tasks is successively the task 1, the task 2, and the task 3.

When the first value is a time ratio, the host may sort the N tasks in descending order of time ratio values. For example, N is 3, and the N tasks are respectively a task 1, a task 2, and a task 3. T1 represents an execution time period of the task 1, T2 represents an execution time period of the task 2, T3 represents an execution time period of the task 3, t1 represents a loading time period of the task 1, t2 represents a loading time period of the task 2, and t3 represents a loading time period of the task 3. It is assumed that the host determines that T1/t1 is greater than T2/t2 and T3/t3 and that T3/t3 is greater than T2/t2. Because T1/t1>T3/t3>T2/t2, an order of the N tasks is successively the task 1, the task 3, and the task 2.

503. Link the sorted N tasks to obtain an image file.

The functional dependency relationship of each of the N tasks is obtained, where the functional dependency relationship of each task is a call relationship between functions included in each of the N tasks. The functions included in each of the sorted N tasks are linked based on the functional dependency relationship of each of the N tasks, to obtain the image file.

The functional dependency relationship is determined, or in other words, the functions included in each task are determined. A configuration file including the functions included in each task is referred to as a link script file. These link script files are used in a linking process. The functions included in each of the N tasks are linked according to a sorting rule that is of the N tasks and that is determined in step 501 and step 502, to generate the image file.

It can be learned from the embodiment corresponding to FIG. 5 that, the N tasks are sorted in descending order of execution time periods or sorted in descending order of time ratio values. In this case, after the N tasks are linked based on the order of the N tasks to generate the image file, the embedded apparatus can first load a task whose execution time period is relatively long after downloading the image file, so that a next task can be loaded in an execution process of a current task; or the embedded apparatus can first load a task whose loading time period is short after downloading the image file, so that it can be ensured that total duration required for loading the N tasks is the shortest, and a time period required for loading the image file is shortened.

It can be learned from the embodiment corresponding to FIG. 5 that, the functional dependency relationship of each of the N tasks in the program source code needs to be obtained; the N tasks are sorted in descending order of the first values; and the N tasks are linked based on the order to generate the image file. The following describes how to select the N tasks from the program source code.

Figure 6:
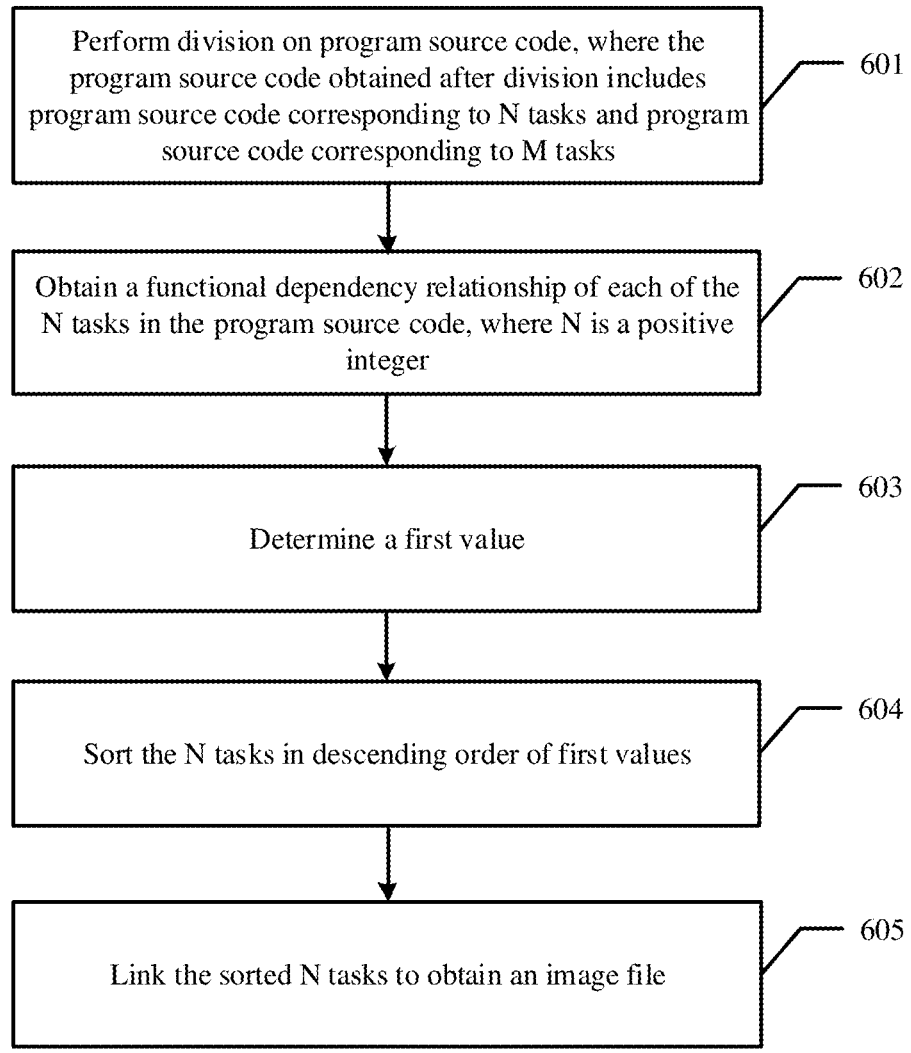
FIG. 6 is a schematic flowchart of another image file obtaining method according to an embodiment of this application.

FIG. 6 is a schematic flowchart of an image file obtaining method according to an embodiment of this application.

As shown in FIG. 6, the image file obtaining method may include the following steps.

601. Perform division on program source code, where the program source code obtained after division includes program source code corresponding to N tasks and program source code corresponding to M tasks.

The N tasks correspond to a key service of an embedded apparatus, and the M tasks correspond to a service of the embedded apparatus other than the key service. For example, when the target machine is an event data recorder, a key service of the target machine may be a video recording service or a wireless connection service, and the program source code may further include other tasks such as a Bluetooth service and a photographing service. The Bluetooth service, the photographing service, and the like are tasks other than the key task. In this solution, which tasks of a plurality of tasks included in the program source code are key tasks, that is, the foregoing N tasks, is determined according to an actual application requirement.

602. Obtain a functional dependency relationship of each of the N tasks in the program source code, where N is a positive integer.

A host analyzes the program source code by using a compilation technology to obtain functional dependency relationships of all the tasks in the program source code. Specifically, the host may obtain syntax tree information of all the tasks in the program source code by using the compilation technology, and may obtain the functional dependency relationships of all the tasks in the program source code based on the syntax tree information of all the tasks in the program source code.

In addition, there may be a plurality of manners of obtaining the functional dependency relationships of the N tasks from the functional dependency relationships of all the tasks. For example, the functional dependency relationships of the N tasks may be obtained based on an annotation in the program source code; or functions of the N tasks may be obtained based on a running result of the program source code to obtain the functional dependency relationships of the N tasks. The following separately provides descriptions.

In a specific implementation, if a developer provides an annotation for the program source code when writing the program source code, and the annotation is used to identify a function of a task, a plurality of tasks in the program source code may be distinguished based on the annotation. In this implementation, the annotation corresponding to the program source code is extracted to obtain a function corresponding to each of the plurality of tasks included in the program source code. A function of a key task is predetermined, and each key task may be determined from the program source code based on the annotation. The functional dependency relationship of each of the N tasks may be obtained based on the annotation and the functional dependency relationships.

In a specific implementation, the N tasks may alternatively be obtained based on the running result of the program source code. If a developer does not provide an annotation for the program source code when writing the program source code, a function corresponding to each of a plurality of tasks included in the program source code may be obtained based on the running result of the program source code. A function of a key task and an input condition are predetermined, and the program source code is run. Each key task may be determined, that is, the N tasks may be obtained, from the program source code based on a running result obtained under the input condition. The functional dependency relationship of each of the N tasks may be obtained based on the running result and the functional dependency relationships of all the tasks.

603. Determine a first value.
604. Sort the N tasks in descending order of first values.
605. Link the sorted N tasks to obtain an image file.

For an understanding about step 603 to step 605, refer to step 502 to step 504 in the embodiment corresponding to FIG. 5. Details are not described herein again.

Figure 7:
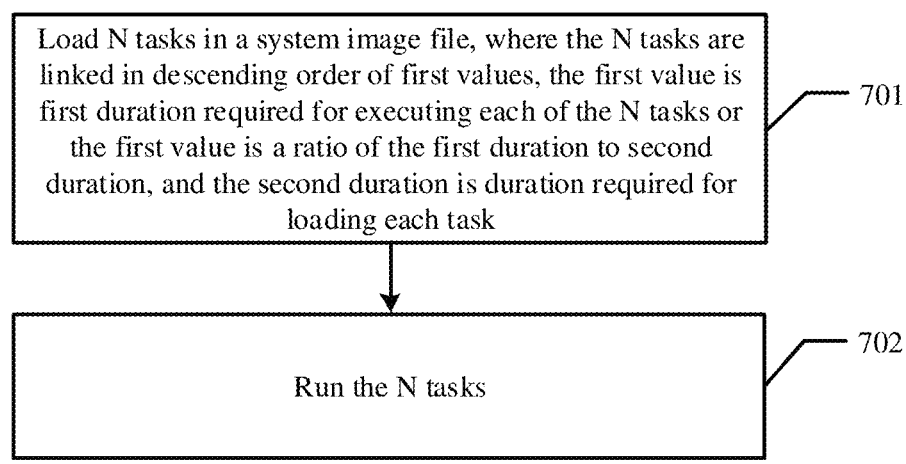
FIG. 7 is a schematic flowchart of a method for starting an embedded apparatus according to an embodiment of this application.

After compilation and linking are completed at the host, the image file may be downloaded from the host to a flash chip of the target machine. When the target machine starts to run, the image file is loaded from the flash chip to a memory of the embedded apparatus, that is, the target machine. With reference to FIG. 7, the following describes a loading process performed after the target machine is started.

FIG. 7 is a schematic flowchart of a method for starting an embedded apparatus according to an embodiment of this application.

As shown in FIG. 7, the method for starting an embedded apparatus may include the following steps.

701. Load N tasks in a system image file.

An embedded apparatus loads the N tasks in the system image file by using a system bootstrap program. Specifically, the system bootstrap program may be modified, so that the N tasks in the system image file are first loaded during image file loading performed by using the system bootstrap program. The N tasks are linked in descending order of first values. The first value is first duration required for executing each of the N tasks or the first value is a ratio of the first duration to second duration, the second duration is duration required for loading each task, and N is a positive integer. For a specific understanding about the N tasks and the image file, refer to the embodiments corresponding to FIG. 5 and FIG. 6. Details are not described herein again.

702. Run the N tasks.

When the embedded apparatus supports concurrent implementation of loading operations and execution operations on different tasks, a first task is run after being loaded, and a next task may be loaded during running of the first task. The next task is, for example, a second task, and the first task and the second task may be any two adjacent linked tasks in the N tasks.

In a specific implementation, the method may further include: loading one or more tasks included in the image file other than the N tasks in the image file after the N tasks are run.

According to this solution provided in this application, in a process of starting the embedded apparatus, not only a key task can be first loaded and executed, but also a time period required for loading the key task can further be shortened. In this solution, the key tasks are sorted, and the sorted N tasks are linked to generate the image file. In this way, a next task can be loaded during running of a current key task, to concurrently implement loading operations and execution operations on different tasks to a greatest extent, thereby ensuring fast start of the embedded apparatus.

Figure 8A:
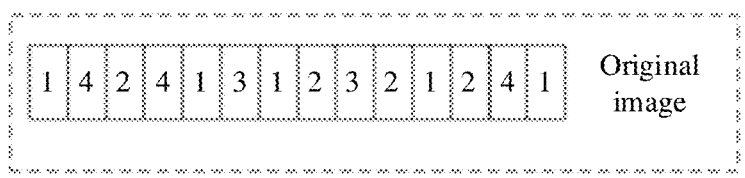
FIG. 8a, FIG. 8b, and FIG. 8c are a schematic diagram of a scenario according to this application.
Figure 8B:
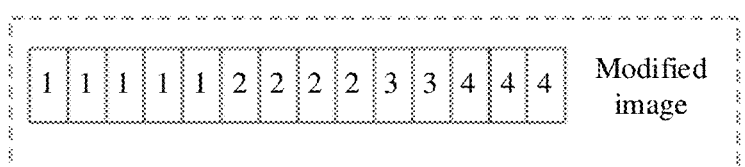
Figure 8C:
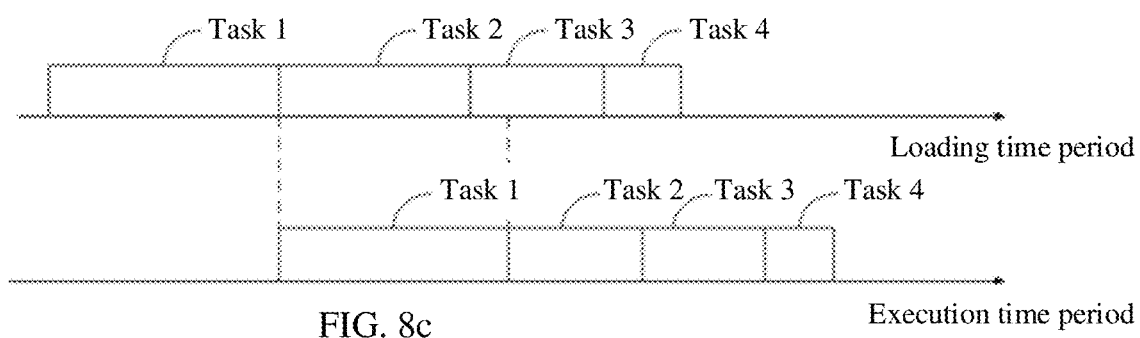

With reference to FIG. 8a, FIG. 8b, and FIG. 8c, that is, a schematic diagram of a scenario according to this application, the following provides an example for description of the solutions provided in the embodiments of this application. Program source code includes all kernel program source code and all application program source code. The program source code includes a plurality of tasks. It is assumed that the program source code includes a plurality of tasks, and four of the tasks are key tasks and are respectively a task 1, a task 2, a task 3, and a task 4. Because the kernel program source code and the application program source code of an embedded apparatus based on a monolithic kernel architecture may be distributed at any locations in an image file, code included in each task, that is, a function included in each task, may be distributed at any location in the image file. In an original image shown in FIG. 8a, a box 1 represents code or a function included in the task 1, a box 2 represents code included in the task 2, a box 3 represents code included in the task 3, and a box 4 represents code included in the task 4. However, it should be noted that different tasks may share same code. For example, any box 1 and any box 4 may represent same code. In this solution, if it is determined, according to the methods described in the embodiments corresponding to FIG. 5 and FIG. 6, that the task 1, the task 2, the task 3, and the task 4 are successively linked, an image file obtained according to this solution is a modified image file shown in FIG. 8b. After compilation and linking are completed at a host, the image file may be downloaded from the host to a flash chip of a target machine. When the target machine starts to run, the image file is loaded from the flash chip to a memory of an embedded apparatus, that is, the target machine. After the target machine, that is, the embedded apparatus, is powered on, the task 1, the task 2, the task 3, and the task 4 are preferentially loaded. As shown in FIG. 8c, the task 1 is run after being loaded, and the task 2 may be loaded during running of the task 1. Because the task 1 requires a longest execution time period, a subsequent task may have been loaded during execution of the task 1. As shown in FIG. 8c, when the task 1 is executed, the task 2 has been loaded, and a part of the task 3 has been loaded. This ensures that the subsequent task can be loaded and executed as soon as possible after the task 1 is executed, to avoid a case in which the task 1 has been executed but the task 2 has not started to be loaded, or a long time is still required for completing loading of the task 2. If sorting is performed based on time ratios, it can be ensured that a total time period required for loading tasks is the shortest. According to this solution, a loading time period of the image file is shortened to fast start the embedded apparatus. After the task 1, the task 2, the task 3, and the task 4 are run, one or more tasks included in the image file other than N tasks in the image file may also be loaded according to a service requirement.

It can be understood that, to implement the foregoing functions, the foregoing development and compilation apparatus and the embedded apparatus include corresponding hardware structures and/or software modules for executing the functions. A person of ordinary skill in the art should be easily aware that, modules and algorithm steps of the examples described with reference to the embodiments disclosed in this specification may be implemented in this application by hardware or a combination of hardware and computer software. Whether a function is performed by hardware or hardware driven by computer software depends on particular applications and design constraint conditions of the technical solutions. A person skilled in the art may use different methods to implement the described functions of each particular application, but it should not be considered that the implementation goes beyond the scope of this application.

In terms of a hardware structure, an image file obtaining apparatus and an embedded apparatus in FIG. 5 to FIG. 7 may be implemented by one physical device, may be jointly implemented by a plurality of physical devices, or may be implemented by a logical function module in one physical device. This is not specifically limited in the embodiments of this application.

Figure 9:
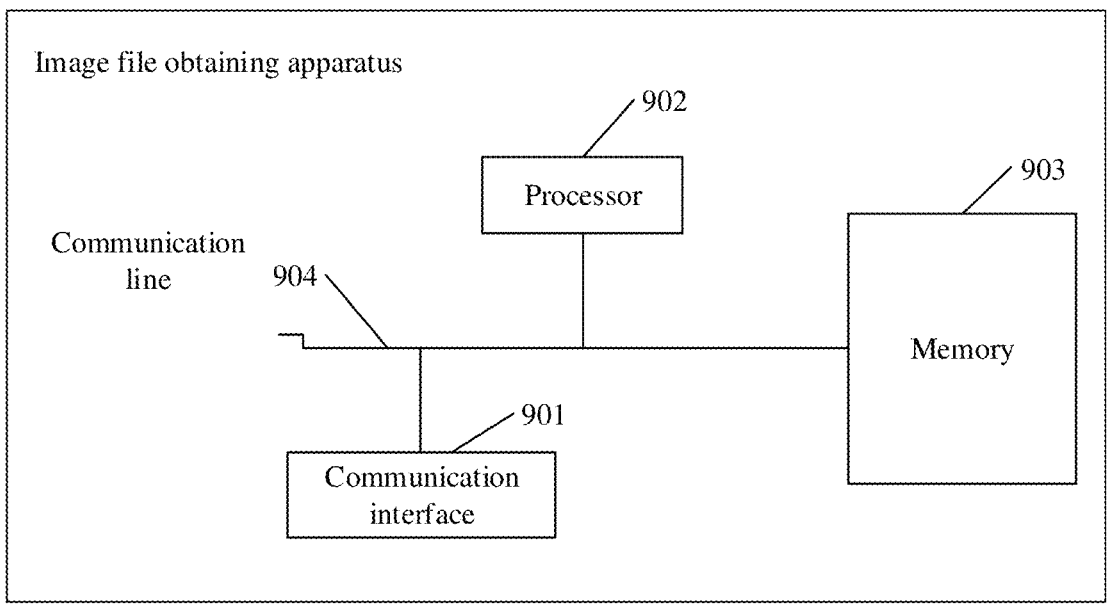
FIG. 9 is a schematic diagram of a hardware structure of an image file obtaining apparatus according to an embodiment of this application.

For example, the image file obtaining apparatus may be implemented by a communication device in FIG. 9. FIG. 9 is a schematic diagram of a hardware structure of an image file obtaining apparatus according to an embodiment of this application. The image file obtaining apparatus includes a communication interface 901 and a processor 902, and may further include a memory 903.

The communication interface 901 may use any apparatus such as a transceiver, to communicate with another device or a communication network, for example, the Ethernet, a radio access network (radio access network, RAN), or a wireless local area network (wireless local area network, WLAN).

The processor 902 includes but is not limited to one or more of a central processing unit (central processing unit, CPU), a network processor (network processor, NP), an application-specific integrated circuit (application-specific integrated circuit, ASIC), or a programmable logic device (programmable logic device, PLD). The PLD may be a complex programmable logic device (complex programmable logic device, CPLD), a field-programmable logic gate array (field-programmable gate array, FPGA), generic array logic (generic array logic, GAL), or any combination thereof. The processor 902 is responsible for management of a communication line 904 and general processing, and may further provide various functions, including timing, peripheral interfacing, voltage regulation, power management, and another control function. The memory 903 may be configured to store data used by the processor 902 when the processor 902 performs an operation.

The memory 903 may be a read-only memory (read-only memory, ROM) or another type of static storage device capable of storing static information and instructions, or a random access memory (random access memory, RAM) or another type of dynamic storage device capable of storing information and instructions. Alternatively, the memory 903 may be an electrically erasable programmable read-only memory (electrically erasable programmable read-only memory, EEPROM), a compact disc read-only memory (compact disc read-only memory, CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The memory may exist independently, and is connected to the processor 902 through the communication line 904. Alternatively, the memory 903 may be integrated into the processor 902. If the memory 903 and the processor 902 are components independent of each other, the memory 903 is connected to the processor 902. For example, the memory 903 may communicate with the processor 902 through the communication line. The communication interface 901 may communicate with the processor 902 through the communication line, or the communication interface 901 may be directly connected to the processor 902.

The communication line 904 may include any quantity of interconnected buses and bridges, and the communication line 904 links together various circuits that include one or more processors 902 represented by the processor 902 and a memory represented by the memory 903. The communication line 904 may further links together other circuits such as a peripheral device, a voltage regulator, and a power management circuit. These are well known in the art, and therefore are not further described in this application.

In a specific implementation, the image file obtaining apparatus may include a memory, configured to store computer-readable instructions; and may further include a processor coupled to the memory, where the processor is configured to execute the computer-readable instructions in the memory to perform the following operations: determining a first value of each of N tasks in program source code, where the first value is first duration required for executing each of the N tasks or the first value is a ratio of the first duration to second duration, the second duration is duration required for loading each of the N tasks, and N is a positive integer; sorting the N tasks in descending order of the first values; and linking the sorted N tasks to obtain an image file.

In a specific implementation, the processor is further configured to: obtain a functional dependency relationship of each of the N tasks, where the functional dependency relationship of each task is a call relationship between functions that may be included in each of the N tasks; and link, based on the functional dependency relationship of each of the N tasks, the functions that may be included in each of the sorted N tasks, to obtain the image file.

In a specific implementation, the processor is specifically configured to: obtain syntax tree information of all tasks in the program source code, where all the tasks may include the N tasks; obtain functional dependency relationships of all the tasks based on the syntax tree information, where the functional dependency relationships of all the tasks are call relationships between functions that may be included in all the tasks; and determine the functional dependency relationship of each of the N tasks based on an annotation in the program source code and the functional dependency relationships of all the tasks, where the annotation is preset and is used to identify a function of a task, and functions of the N tasks are prespecified.

In a specific implementation, the processor is further configured to perform division on the program source code, where the program source code obtained after division may include program source code corresponding to the N tasks and program source code corresponding to M tasks, the N tasks correspond to a key service of an embedded apparatus, and the M tasks correspond to a service of the embedded apparatus other than the key service.

In a specific implementation, the processor is specifically configured to: determine a start location and an end location of each of the N tasks based on the functional dependency relationship of each of the N tasks, where the start location may include a first timestamp, and the end location may include a second timestamp; and run each of the N tasks, and determine the first value based on a difference between the first timestamp and the second timestamp.

In the embodiments of this application, function unit division may be performed on the image file obtaining apparatus based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into the units is an example and merely logical function division, and may be other division in an actual implementation.

Figure 10:
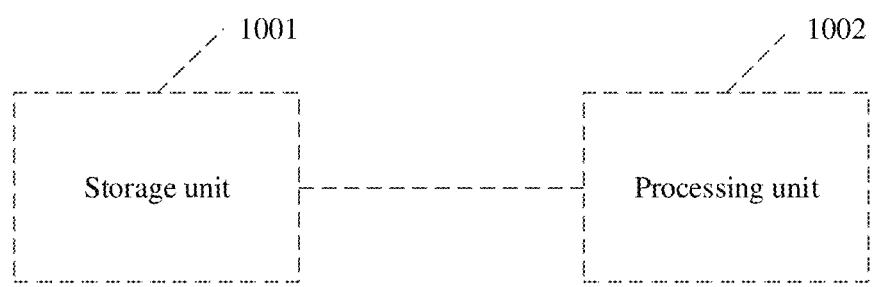
FIG. 10 is a schematic diagram of a structure of an image file obtaining apparatus according to an embodiment of this application.

For example, when functional units are obtained through division in an integrated manner, FIG. 10 is a schematic diagram of a structure of an image file obtaining apparatus.

As shown in FIG. 10, the image file obtaining apparatus provided in this embodiment of this application includes: a storage unit 1001, configured to store computer-readable instructions; and may further include a processing unit 1002 coupled to the storage unit 1001, where the processing unit 1002 is configured to execute the computer-readable instructions in the storage unit 1001 to perform the following operations: obtaining a functional dependency relationship of each of N tasks in program source code, where N is a positive integer; determining a first value, where the first value is first duration required for executing each of the N tasks or the first value is a ratio of the first duration to second duration, and the second duration is duration required for loading each task; sorting the N tasks in descending order of first values; and linking the N tasks based on the functional dependency relationship and the order to generate an image file.

In a specific implementation, the processing unit 1002 is specifically configured to: obtain syntax tree information of all tasks in the program source code; obtain functional dependency relationships of all the tasks in the program source code based on the syntax tree information of all the tasks; and determine the functional dependency relationship of each of the N tasks based on an annotation in the program source code and the functional dependency relationships of all the tasks, where the annotation is preset and is used to identify a function of a task, and functions of the N tasks are prespecified.

In a specific implementation, the processing unit 1002 is further configured to perform division on the program source code, where the program source code obtained after division may include program source code corresponding to the N tasks and program source code corresponding to M tasks, the N tasks correspond to a key service of an embedded apparatus, and the M tasks correspond to a service of the embedded apparatus other than the key service.

In a specific implementation, the processing unit 1002 is specifically configured to: determine a start location and an end location of each of the N tasks based on the functional dependency relationship of each of the N tasks, where the start location may include a first timestamp, and the end location may include a second timestamp; and run each of the N tasks, and determine the first value based on a difference between the first timestamp and the second timestamp.

Figure 11:
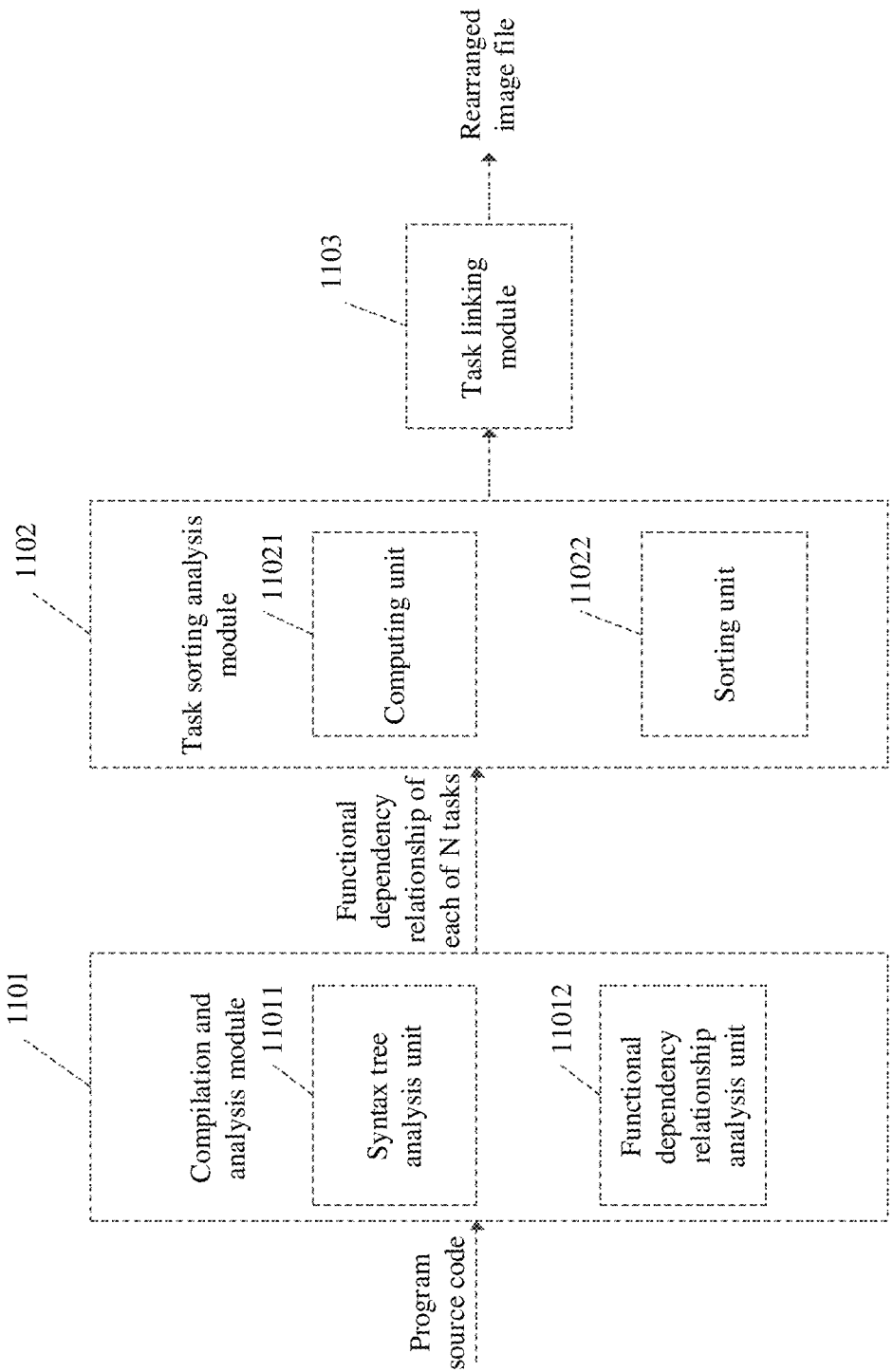
FIG. 11 is a schematic diagram of a structure of an image file obtaining apparatus according to an embodiment of this application.

For another example, when functional units are obtained through division in correspondence to various functions, FIG. 11 is a schematic diagram of a structure of an image file obtaining apparatus.

As shown in FIG. 11, the image file obtaining apparatus provided in this embodiment of this application includes: a compilation and analysis module 1101, configured to obtain a functional dependency relationship of each of N tasks in program source code, where N is a positive integer; a task sorting analysis module 1102, configured to: determine a first value, where the first value is first duration required for executing each of the N tasks or the first value is a ratio of the first duration to second duration, and the second duration is duration required for loading each task; and sort the N tasks in descending order of first values; and a task linking module 1103, configured to link, based on the functional dependency relationship of each of the N tasks, functions included in each of the sorted N tasks, to obtain an image file.

In a specific implementation, the compilation and analysis module 1101 includes a syntax tree analysis unit 11011 and a functional dependency relationship analysis unit 11012. The syntax tree analysis unit 11011 is configured to obtain syntax tree information of all tasks in the program source code of the image file. The functional dependency relationship analysis unit 11012 is configured to: obtain functional dependency relationships of all the tasks in the program source code based on the syntax tree information of all the tasks; and determine the functional dependency relationship of each of the N tasks based on an annotation in the program source code and the functional dependency relationships of all the tasks, where the annotation is preset and is used to identify a function of a task, and functions of the N tasks are prespecified.

In a specific implementation, the task sorting analysis module 1102 includes a computing unit 11021 and a sorting unit 11022. The computing unit 11021 is configured to: determine a start location and an end location of each of the N tasks based on the functional dependency relationship of each of the N tasks, where the start location may include a first timestamp, and the end location may include a second timestamp; and run each of the N tasks, and determine the first value based on a difference between the first timestamp and the second timestamp. The sorting unit 11022 is configured to sort the N tasks in descending order of the first values.

Figure 12:
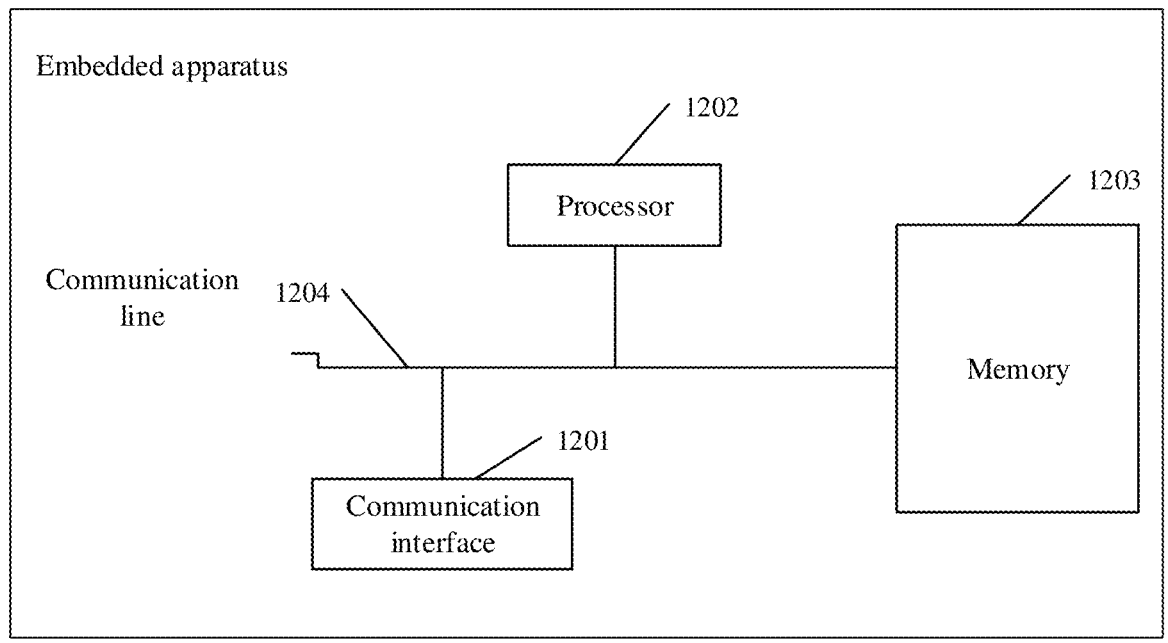
FIG. 12 is a schematic diagram of a hardware structure of an embedded apparatus according to an embodiment of this application.

In addition, an embedded apparatus may be implemented by a communication device in FIG. 12. FIG. 12 is a schematic diagram of a hardware structure of the embedded apparatus according to an embodiment of this application. The embedded apparatus includes a communication interface 1201 and a processor 1202, and may further include a memory 1203.

The communication interface 1201 may be any apparatus such as a transceiver, and is configured to communicate with another device or a communication network, for example, the Ethernet, a radio access network (radio access network, RAN), or a wireless local area network (wireless local area network, WLAN).

The processor 1202 includes but is not limited to one or more of a central processing unit (central processing unit, CPU), a network processor (network processor, NP), an application-specific integrated circuit (application-specific integrated circuit, ASIC), or a programmable logic device (programmable logic device, PLD). The PLD may be a complex programmable logic device (complex programmable logic device, CPLD), a field-programmable logic gate array (field-programmable gate array, FPGA), generic array logic (generic array logic, GAL), or any combination thereof. The processor 1202 is responsible for a communication line 1204 and general processing, and may further provide various functions, including timing, peripheral interfacing, voltage regulation, power management, and another control function. The memory 1203 may be configured to store data used by the processor 1202 when the processor 1202 performs an operation.

The memory 1203 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor 1202 through the communication line 1204. Alternatively, the memory 1203 may be integrated into the processor 1202. If the memory 1203 and the processor 1202 are mutually independent components, the memory 1203 is connected to the processor 1202. For example, the memory 1203 and the processor 1202 may communicate with each other through the communication line. The communication interface 1201 and the processor 1202 may communicate with each other through a communication line, and the communication interface 1201 may alternatively be connected to the processor 1202 directly.

The communication line 1204 may include any quantity of interconnected buses and bridges, and the communication line 1204 links together various circuits including one or more processors 1202 represented by the processor 1202 and a memory represented by the memory 1203. The communication line 1204 may further link various other circuits such as a peripheral device, a voltage stabilizer, and a power management circuit. These are well known in the art, and therefore are not further described in this specification.

In a specific implementation, the embedded apparatus may include a memory, configured to store computer-readable instructions; and may further include a processor coupled to the memory, where the processor is configured to execute the computer-readable instructions in the memory to perform the following operation: loading N tasks in a system image file, and running the N tasks, where the N tasks are linked in descending order of first values, the first value is first duration required for executing each of the N tasks or the first value is a ratio of the first duration to second duration, the second duration is duration required for loading each task, and N is a positive integer.

In a specific implementation, the processor is further configured to load one or more tasks that may be included in the image file other than the N tasks in the image file after the N tasks are run.

In the embodiments of this application, functional unit division may be performed on the embedded apparatus based on the example of the method. For example, functional units may be divided based on corresponding functions, or two or more than two functions may be integrated into one processing unit. The integrated unit may be implemented in a form of hardware, or may be implemented in a form of a software functional unit. It should be noted that, in the embodiments of this application, division into the units is an example and merely logical function division, and may be other division in an actual implementation.

Figure 13:
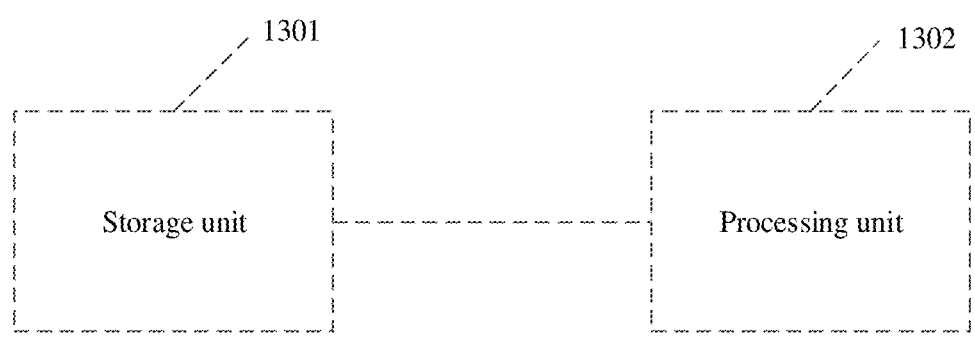
FIG. 13 is a schematic diagram of a structure of an apparatus according to an embodiment of this application.

For example, when function units are divided through integration, FIG. 13 is a schematic diagram of a structure of an embedded apparatus.

As shown in FIG. 13, the embedded apparatus provided in this embodiment of this application includes a storage unit 1301, configured to store computer-readable instructions; and may further include a processing unit 1302 coupled to the storage unit 1301, where the processing unit 1302 is configured to execute the computer-readable instructions in the storage unit 1301 to perform the following operation: loading N tasks in a system image file, and running the N tasks, where the N tasks are linked in descending order of first values, the first value is first duration required for executing each of the N tasks or the first value is a ratio of the first duration to second duration, the second duration is duration required for loading each task, and N is a positive integer.

In a specific implementation, the processing unit 1302 is further configured to load one or more tasks that may be included in the image file other than the N tasks in the image file after the N tasks are run.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedure or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, or an optical disc, or the like.

The image file obtaining method, the method for starting an embedded apparatus, the image file obtaining apparatus, and the embedded apparatus that are provided in the embodiments of this application are described above in detail. In this specification, specific examples are used for illustration of principles and implementations of this application. The descriptions of the foregoing embodiments are merely used to help understand the method and the core idea of this application. In addition, a person of ordinary skill in the art can make modifications in terms of specific implementations and scope of application in accordance with the idea of this application. In conclusion, content of this specification should not be construed as a limitation on this application.

What is claimed is:

1. An image file obtaining method, comprising:
    determining a first value of each of N tasks in program source code, wherein the first value is a ratio of first duration to second duration, the first duration is duration required for executing said each of the N tasks, the second duration is duration required for loading said each of the N tasks, and N is a positive integer;
    sorting the N tasks in descending order of the first values; and
    linking the sorted N tasks to obtain an image file, wherein the method further comprises:
        obtaining a functional dependency relationship of each of the N tasks, wherein the functional dependency relationship is a call relationship between functions comprised in said each of the N tasks; and
    the linking comprises:
        linking, based on the functional dependency relationship of each of the N tasks, the functions comprised in each of the sorted N tasks, wherein parts of the program source code corresponding to the sorted and linked N tasks are compiled to obtain the image file.

2. The method according to claim 1, wherein the obtaining comprises:
    obtaining syntax tree information of all tasks in the program source code, wherein all the tasks comprise the N tasks;
    obtaining functional dependency relationships of all the tasks based on the syntax tree information, wherein the functional dependency relationships of all the tasks are call relationships between functions comprised in all the tasks; and
    determining the functional dependency relationship of each of the N tasks based on an annotation in the program source code and the functional dependency relationships of all the tasks, wherein the annotation is preset and identifies a function of a task, and functions of the N tasks are prespecified.

3. The method according to claim 1, wherein the method further comprises:
    performing division on the program source code to divide the program source code into first program source code corresponding to the N tasks and second program source code corresponding to M tasks, wherein the N tasks correspond to a key service of an embedded apparatus, and the M tasks correspond to a service of the embedded apparatus other than the key service.

4. The method according to claim 3, wherein the image file is a system image file to be loaded and run by the embedded apparatus, in response to the embedded apparatus being powered on, wherein
    the N tasks linked in the image file are loaded by the embedded apparatus in the descending order of the first values,
    while a first task of the N tasks is being run by the embedded apparatus, a second task of the N tasks is loaded by the embedded apparatus, wherein the second task is a task subsequent to the first task in the descending order of the first values, and
    after the N tasks are run by the embedded apparatus, one or more tasks other than the N tasks and included the image file are loaded by the embedded apparatus.

5. The method according to claim 1, wherein the determining comprises:
    determining a start location and an end location of each of the N tasks based on the functional dependency relationship of said each of the N tasks, wherein the start location comprises a first timestamp, and the end location comprises a second timestamp; and
    running said each of the N tasks, and determining the first value based on a difference between the first timestamp and the second timestamp.

6. The method according to claim 1, wherein the image file is a system image file to be loaded and run by an embedded apparatus, in response to the embedded apparatus being powered on.

7. The method according to claim 1, wherein the image file is a system image file to be loaded and run by an embedded apparatus, in response to the embedded apparatus being powered on, wherein
    the N tasks linked in the image file are loaded by the embedded apparatus in the descending order of the first values, and
    while a first task of the N tasks is being run by the embedded apparatus, a second task of the N tasks is loaded by the embedded apparatus, wherein the second task is a task subsequent to the first task in the descending order of the first values.

8. An image file obtaining apparatus, comprising:
    a memory storing computer-readable instructions; and
    a processor coupled to the memory, wherein the processor is configured to execute the computer-readable instructions in the memory to perform:

determining a first value of each of N tasks in program
source code, wherein the first value is a ratio of first
duration to second duration, the first duration is duration required for executing said each of the N tasks, the
second duration is duration required for loading said
each of the N tasks, and N is a positive integer;
sorting the N tasks in descending order of the first values;
and
linking the sorted N tasks to obtain an image file, wherein
the processor is further configured to perform:
obtaining a functional dependency relationship of each
of the N tasks, wherein the functional dependency
relationship is a call relationship between functions
comprised in said each of the N tasks; and
the linking comprises:
linking, based on the functional dependency relationship of each of the N tasks, the functions comprised
in each of the sorted N tasks, wherein parts of the
program source code corresponding to the sorted and
linked N tasks are compiled to obtain the image file.

9. The apparatus according to claim 8, wherein the processor is further configured to:
obtain syntax tree information of all tasks in the program
source code, wherein all the tasks comprise the N tasks;
obtain functional dependency relationships of all the tasks
based on the syntax tree information, wherein the
functional dependency relationships of all the tasks are
call relationships between functions comprised in all
the tasks; and
determine the functional dependency relationship of each
of the N tasks based on an annotation in the program
source code and the functional dependency relationships of all the tasks, wherein the annotation is preset
and identifies a function of a task, and functions of the
N tasks are prespecified.

10. The apparatus according to claim 8, wherein the processor is further configured to:
perform division on the program source code to divide the
program source code into first program source code
corresponding to the N tasks and second program
source code corresponding to M tasks, wherein the N
tasks correspond to a key service of an embedded
apparatus, and the M tasks correspond to a service of
the embedded apparatus other than the key service.

11. The apparatus according to claim 8, wherein the processor is further configured to:
determine a start location and an end location of each of
the N tasks based on the functional dependency relationship of said each of the N tasks, wherein the start
location comprises a first timestamp, and the end location comprises a second timestamp; and
run said each of the N tasks, and determine the first value
based on a difference between the first timestamp and
the second timestamp.

12. The apparatus according to claim 8, wherein the image file is a system image file to be loaded and run by an embedded apparatus, in response to the embedded apparatus being powered on.

13. A non-transitory computer-readable storage medium storing computer-readable instructions, wherein when the computer-readable instructions are run on a computer apparatus, the computer apparatus is enabled to perform a method comprising:
determining a first value of each of N tasks in program
source code, wherein the first value is a ratio of first
duration to second duration, the first duration is duration required for executing said each of the N tasks, the
second duration is duration required for loading said
each of the N tasks, and N is a positive integer;
sorting the N tasks in descending order of the first values;
and
linking the sorted N tasks to obtain an image file, wherein
the method further comprises:
obtaining a functional dependency relationship of each
of the N tasks, wherein the functional dependency
relationship is a call relationship between functions
comprised in said each of the N tasks; and
the linking comprises:
linking, based on the functional dependency relationship of each of the N tasks, the functions comprised
in each of the sorted N tasks, wherein parts of the
program source code corresponding to the sorted and
linked N tasks are compiled to obtain the image file.

14. The medium according to claim 13, wherein the obtaining comprises:
obtaining syntax tree information of all tasks in the
program source code, wherein all the tasks comprise
the N tasks;
obtaining functional dependency relationships of all the
tasks based on the syntax tree information, wherein the
functional dependency relationships of all the tasks are
call relationships between functions comprised in all
the tasks; and
determining the functional dependency relationship of
each of the N tasks based on an annotation in the
program source code and the functional dependency
relationships of all the tasks, wherein the annotation is
preset and identifies a function of a task, and functions
of the N tasks are prespecified.

15. The medium according to claim 13, wherein the method further comprises:
performing division on the program source code to divide
the program source code into first program source code
corresponding to the N tasks and second program
source code corresponding to M tasks, wherein the N
tasks correspond to a key service of an embedded
apparatus, and the M tasks correspond to a service of
the embedded apparatus other than the key service.

16. The medium according to claim 13, wherein the determining comprises:
determining a start location and an end location of each of
the N tasks based on the functional dependency relationship of said each of the N tasks, wherein the start
location comprises a first timestamp, and the end location comprises a second timestamp; and
running said each of the N tasks, and determining the first
value based on a difference between the first timestamp
and the second timestamp.

17. The medium according to claim 13, wherein the image file is a system image file to be loaded and run by an embedded apparatus, in response to the embedded apparatus being powered on.

* * * * *